United States Patent
Ike et al.

(10) Patent No.: US 11,715,049 B2
(45) Date of Patent: Aug. 1, 2023

(54) INFORMATION PROCESSING DEVICE AND METHOD

(71) Applicant: Kabushiki Kaisha Toshiba, Tokyo (JP)

(72) Inventors: Tsukasa Ike, Tokyo (JP); Sawa Fuke, Kawasaki Kanagawa (JP); Kazunori Imoto, Kawasaki Kanagawa (JP); Kanako Nakayama, Tokyo (JP); Yasunobu Yamauchi, Yokohama Kanagawa (JP); Tomohiro Nakai, Kawasaki Kanagawa (JP); Yasuyuki Tsunoi, Tokorozawa Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 436 days.

(21) Appl. No.: 15/904,633

(22) Filed: Feb. 26, 2018

(65) Prior Publication Data
US 2019/0026682 A1  Jan. 24, 2019

(30) Foreign Application Priority Data
Jul. 18, 2017  (JP) .............................. JP2017-139318

(51) Int. Cl.
*G06Q 10/00* (2023.01)
*G06Q 10/0631* (2023.01)
(Continued)

(52) U.S. Cl.
CPC ..... *G06Q 10/063114* (2013.01); *G06Q 10/04* (2013.01); *G06Q 10/0633* (2013.01); *G06Q 10/06313* (2013.01); *G06Q 10/06398* (2013.01)

(58) Field of Classification Search
CPC ....................... G06Q 10/04; G06Q 10/063114
See application file for complete search history.

(56) References Cited

U.S. PATENT DOCUMENTS

| | | | |
|---|---|---|---|
| 10,238,335 B2* | 3/2019 | Kenyon | A61B 5/7267 |
| 2006/0020509 A1* | 1/2006 | Strain | G06Q 30/0235 |
| | | | 705/14.35 |

(Continued)

FOREIGN PATENT DOCUMENTS

| | | |
|---|---|---|
| JP | 2005-56062 A | 3/2005 |
| JP | 2010-140305 A | 6/2010 |

(Continued)

OTHER PUBLICATIONS

S. Shoval, Y. Koren and J. Borenstein, "Optimal task allocation in task-agent-control state space," Proceedings of IEEE Systems Man and Cybernetics Conference—SMC, Le Touquet, France, 1993, pp. 27-32 vol. 4 (Year: 1993).*

*Primary Examiner* — Rutao Wu
*Assistant Examiner* — Tyrone E Singletary
(74) *Attorney, Agent, or Firm* — Finnegan, Henderson, Farabow, Garrett & Dunner, LLP

(57) ABSTRACT

According to one embodiment, an information processing device includes a hardware processor configured to acquire operation cost information indicative of a relationship between a state of an operator and a period of time required for the operator to perform an operation from a storage that stores the operation cost information, acquire state information indicative of a state of a target operator, and calculate a period of time required for the target operator to perform a target operation based on the operation cost information and the state information.

14 Claims, 7 Drawing Sheets

(51) Int. Cl.
*G06Q 10/04* (2023.01)
*G06Q 10/0639* (2023.01)
*G06Q 10/0633* (2023.01)

(56) References Cited

U.S. PATENT DOCUMENTS

| | | | |
|---|---|---|---|
| 2009/0070163 A1* | 3/2009 | Angell | G06Q 10/04 705/7.26 |
| 2009/0222552 A1* | 9/2009 | Chroscielewski | H04L 63/0428 709/224 |
| 2016/0090097 A1* | 3/2016 | Grube | A61B 5/18 340/576 |
| 2017/0046642 A1* | 2/2017 | Bishop | A61B 5/0205 |
| 2017/0357930 A1* | 12/2017 | Tani | G06Q 10/063114 |
| 2018/0032944 A1* | 2/2018 | Sarvana | G06Q 10/063114 |
| 2018/0060787 A1* | 3/2018 | Noda | G06Q 10/06312 |

FOREIGN PATENT DOCUMENTS

| | | |
|---|---|---|
| JP | 2010-271748 A | 12/2010 |
| JP | 2012-14373 A | 1/2012 |
| JP | 2016-194736 A | 11/2016 |

\* cited by examiner

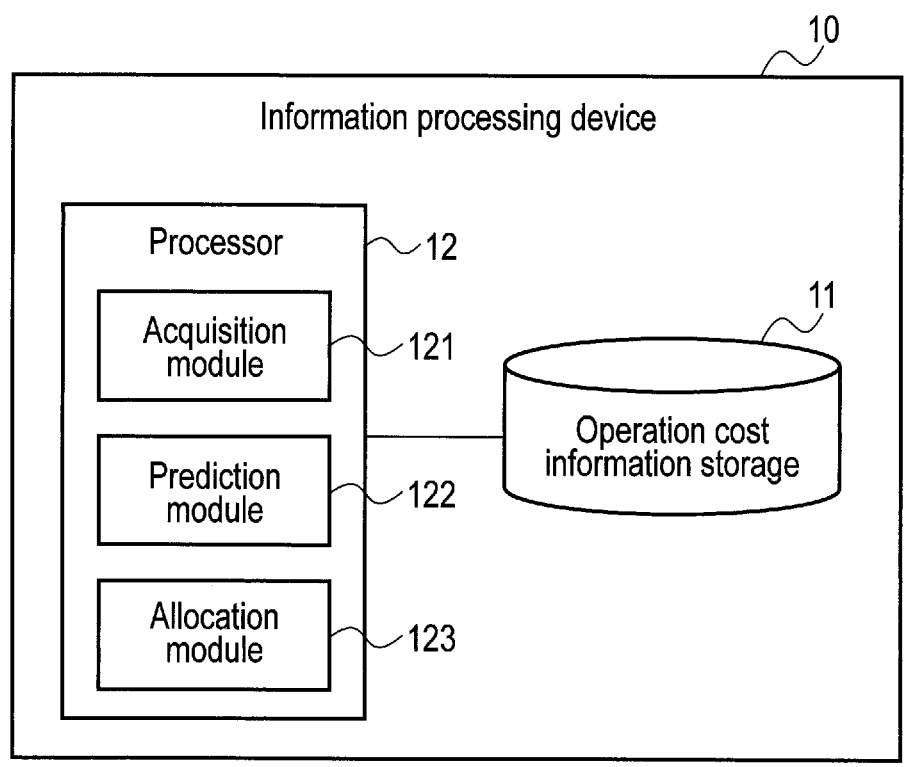
F I G. 1

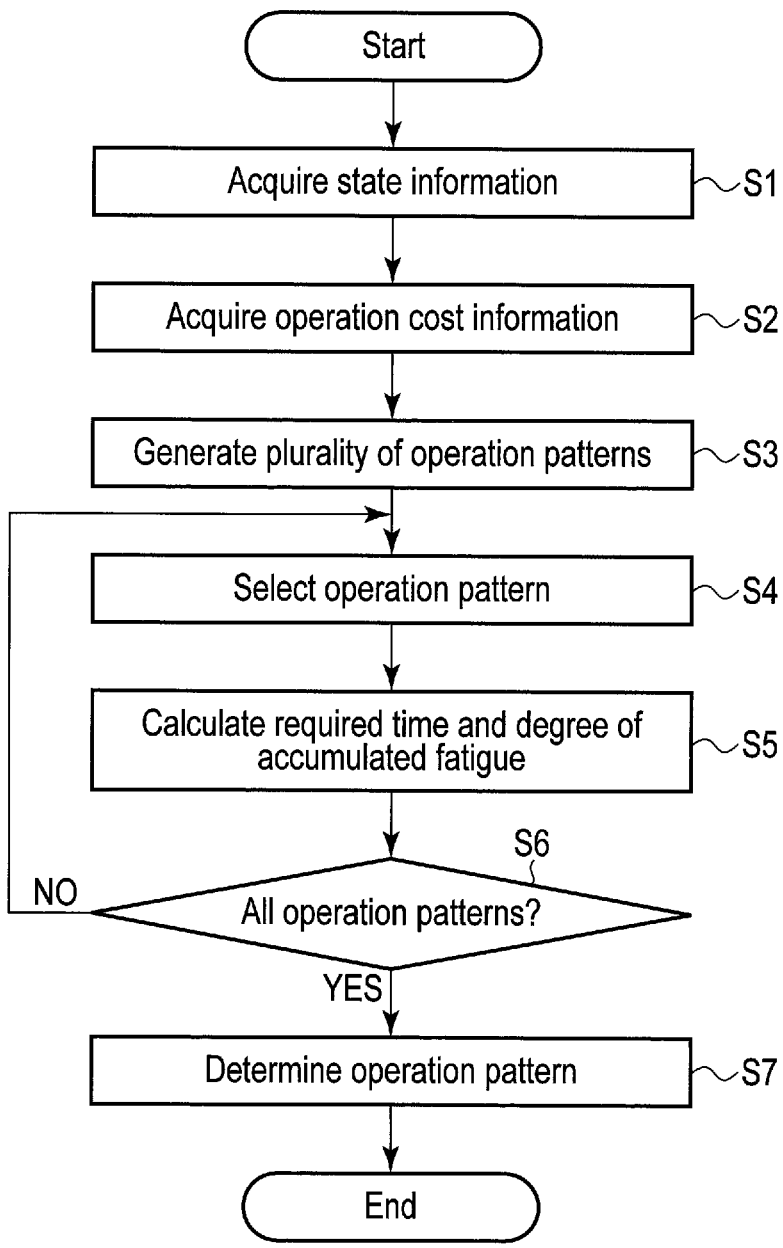

| Operation ID | State information | Type | Time | Degree of fatigue |
|---|---|---|---|---|
| - - - | - - - | - - - | - - - | - - - |

FIG. 4

First operation pattern

| Operator A | First operation X |
|---|---|
| | Second operation Y |

FIG. 5

Second operation pattern

| Operator A | First operation Y |
|---|---|
| | Second operation X |

FIG. 6

Third operation pattern

| Operator A | First operation X |
|---|---|
| | Second operation Y |
| Operator B | First operation Z |

FIG. 7

| Operator ID | Accumulated operation time | Operation history | Skill |
|---|---|---|---|
| --- | --- | --- | --- |

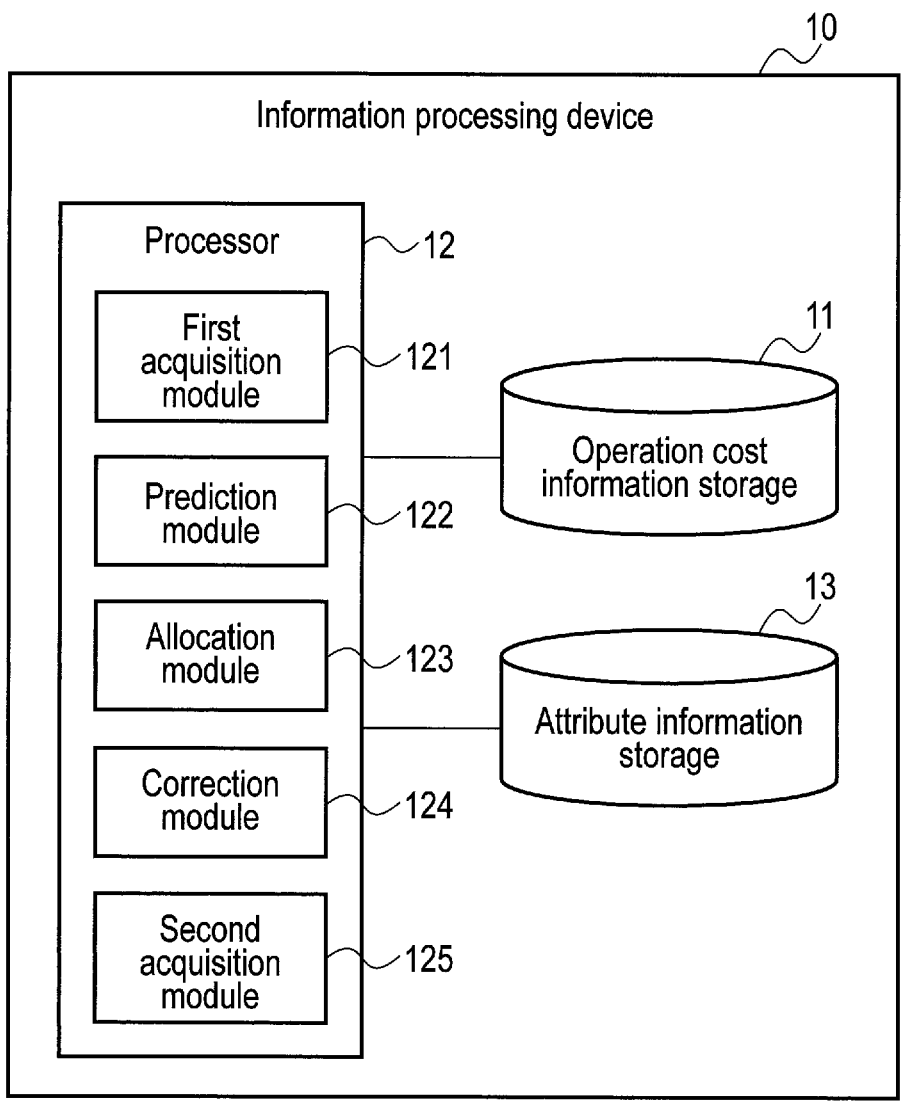
F I G. 11
| Operator ID | Operation history | Weather | Temperature | Humidity | Atmospheric pressure |
|---|---|---|---|---|---|
| - - - | - - - | - - - | - - - | - - - | - - - |
F I G. 13

INFORMATION PROCESSING DEVICE AND METHOD

CROSS-REFERENCE TO RELATED APPLICATIONS

This application is based upon and claims the benefit of priority from Japanese Patent Application No. 2017-139318, filed Jul. 18, 2017, the entire contents of which are incorporated herein by reference.

FIELD

Embodiments described herein relate generally to an information processing device and a method.

BACKGROUND

Operations performed in a manufacturing site and an office are allocated in advance to operating employees (hereinafter referred to as the operators) in order to achieve high productivity with limited human resources. This allocation of operations is referred to as the scheduling of operations.

In recent years, there has been developed an information processing device (operation scheduling device) that can automatically perform the scheduling of operations.

However, despite the fact that operating efficiency differs depending on states (a physical condition and a skill) of the operators performing the operations, the above information processing device cannot perform the scheduling of operations in consideration of the states of the operators.

BRIEF DESCRIPTION OF THE DRAWINGS

FIG. 1 is a block diagram showing an example of a configuration of an information processing device according to a first embodiment;

FIG. 2 is a flowchart showing an example of a processing procedure of the information processing device;

FIG. 3 is a diagram showing an example of a data structure of state information;

FIG. 4 is a diagram showing an example of a data structure of operation history information;

FIG. 5 is a diagram showing an example of an operation pattern;

FIG. 6 is a diagram showing an example of an operation pattern;

FIG. 7 is a diagram showing an example of an operation pattern;

FIG. 11 is a block diagram showing an example of a configuration of the information processing device according to a third embodiment;

FIG. 13 is a diagram showing an example of a data structure of the attribute information.

DETAILED DESCRIPTION

Figures 8, 10:
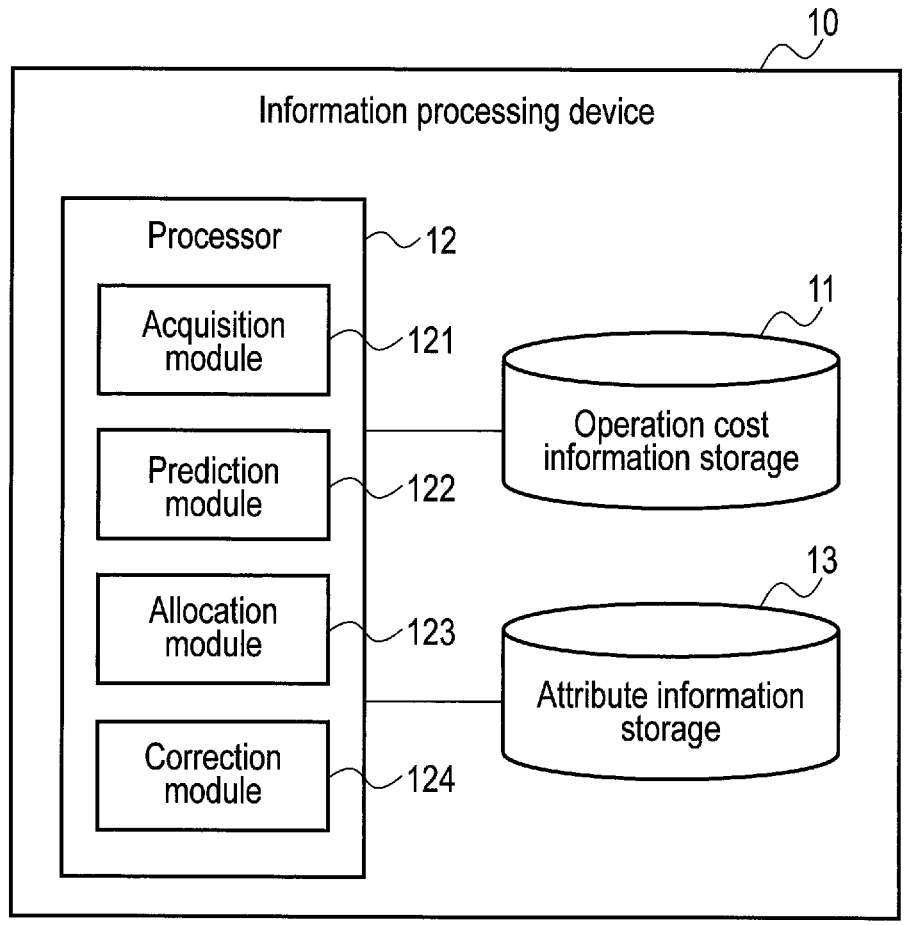
FIG. 8 is a block diagram showing an example of a configuration of the information processing device according to a second embodiment.
FIG. 10 is a diagram showing an example of a data structure of attribute information.

In general, according to one embodiment, an information processing device includes a hardware processor configured to acquire operation cost information indicative of a relationship between a state of an operator and a period of time required for the operator to perform an operation from a storage that stores the operation cost information; acquire state information indicative of a state of a target operator; and calculate a period of time required for the target operator to perform a target operation based on the operation cost information and the state information.

Various embodiments will be described hereinafter with reference to the accompanying drawings.

First Embodiment

FIG. 1 is a block diagram showing an example of a configuration of an information processing device (operation scheduling device) according to a first embodiment. The information processing device according to the present embodiment includes electronic device, such as a personal computer (PC), used for allocating suitable operations to the operators (that is, performing the scheduling of operations).

As shown in FIG. 1, an information processing device 10 includes an operation cost information storage 11 and a processor 12.

The operation cost information storage 11 is implemented, for example, by using a storage device, such as a hard disk drive (HDD), a solid state drive (SSD), a read only memory (ROM), or a random access memory (RAM), included in the information processing device 10.

The operation cost information storage 11 stores operation cost information indicative of a relationship between a state of the operator, a type of an operation, time required for the operator to perform the operation, and degree of fatigue of the operator due to the operation. The operation cost information is generated based on information indicative of a history of operations performed by the operator in the past (hereinafter referred to as the operation history information). Details of the operation cost information will be described later.

The processor 12 includes a computer (such as a hardware processor) included in the information processing device 10 that executes a program stored in the storage device. Programs executed by the computer include an operating system, and an application program that performs the scheduling of operations (hereinafter referred to as the scheduling program).

The processor 12 includes an acquisition module 121, a prediction module 122, and an allocation module 123. A part or whole of the modules 121 to 123 included in the processor 12 is implemented, for example, by causing the computer to execute the scheduling program, that is, by software. The scheduling program executed by the computer may be stored in a computer-readable storage medium and distributed, or downloaded to the information processing device 10 through a network.

A part or whole of the modules 121 to 123 may be implemented by hardware, such as an integrated circuit (IC), or by a combined configuration of software and hardware.

The acquisition module 121 acquires information (hereinafter referred to as the state information) indicative of a state of the operator to be allocated with an operation (hereinafter referred to as the target operator). This state information is indicative of a state of the operator that may be a factor that, for example, influences operating efficiency.

The prediction module (calculation module) 122 predicts (calculates) a time period required for the target operator to perform an operation to be allocated to the target operator (hereinafter referred to as the target operation) based on the operation cost information stored in the operation cost information storage 11 and the state information acquired by the acquisition module 121.

The prediction module 122 also predicts (calculates) degree of fatigue of the target operator due to the target operation (that is, degree of fatigue of the target operator after performing the target operation) based on the operation cost information stored in the operation cost information storage 11 and the state information acquired by the acquisition module 121.

The allocation module 123 allocates the target operation to the target operator based on the time period and the degree of fatigue predicted by the prediction module 122. The allocation module 123 may allocate a plurality of operations (the target operations) to an operator (the target operator), an operation to a plurality of operators, or a plurality of operations to a plurality of operators.

Next, an example of a processing procedure of the information processing device 10 according to the present embodiment will be described with reference to a flowchart of FIG. 2. The number of the target operators may be one or more than one. The number of the target operations may be one or more than one. Information relating to the target operator (operator ID), information relating to the target operation (operation ID), and the like are assumed to be held in the information processing device 10 in advance.

The acquisition module 121 acquires the state information indicative of a state of the target operator (Step S1). As shown, for example, in FIG. 3, the state information includes information relating to a physical condition of the target operator (degree of physical fatigue, degree of mental fatigue, a blood sugar level, concentration power, degree of tension, a blood alcohol concentration) in association with the operator ID.

The operator ID is an identifier for uniquely identifying the target operator. On the other hand, information relating to a physical condition of the target operator can be acquired by using a variety of sensors attached to (mounted on) the target operator.

Specifically, (information relating to) degree of physical fatigue can be acquired by using, for example, a myogenic potential sensor attached to the target operator. The myogenic potential sensor can measure a voltage (myogenic potential) which is generated when a muscle is moved. In this case, a change amount of a myogenic potential measured by the myogenic potential sensor (that is, information output from the myogenic potential sensor) and the like are acquired as information relating to the degree of physical fatigue.

(Information relating to) a blood sugar level can be acquired by using, for example, (a wearable device including) a blood sugar level sensor attached to the target operator. The blood sugar level sensor is, for example, adhered to the operator, and can measure a blood sugar level from a body fluid and the like of the operator.

(Information relating to) concentration power and degree of tension can be acquired by using, for example, an ocular potential sensor (or a wearable device including an ocular potential sensor) attached to the target operator. The ocular potential sensor can measure an ocular potential of the operator by using, for example, an ocular potential sensing technique. The ocular potential sensor acquires an ocular potential by measuring a potential difference generated between a corneal side and a retinal side of an eyeball that changes depending on a movement of the eyeball. The number of blinks of the target operator can be acquired based on the ocular potential measured by the ocular potential sensor. For this reason, the number of blinks (information output from the ocular potential sensor) of the target operator and the like can be acquired, for example, as information relating to the concentration power and the degree of tension. The information relating to the concentration power and the degree of tension may be, for example, a change amount of a direction of a visual line detected by a visual line detection sensor.

In the description which has been made so far, the state information includes information relating to the degree of physical fatigue, the blood sugar level, the concentration power, and the degree of tension in association with the operation ID as shown in FIG. 3. However, information relating to a physical condition of the target operator included in the state information is not limited to the above-mentioned pieces of information, and may be, for example, information relating to a mental state and the like of the operator, or any other information as long as the information influences operating efficiency.

The above-mentioned sensors used for acquiring the state information are mere examples, and other sensors may be used as long as such sensors can acquire information relating to a physical condition of the target operator.

Description will be made by assuming that information relating to a physical condition of the target operator is acquired in real time by using a variety of sensors. However, information relating to a physical condition of the target operator may be acquired, for example, in a manner that the target operator inputs a value measured in advance.

Referring back to FIG. 2, the prediction module 122 acquires the operation cost information stored in the operation cost information storage 11 (step S2).

In the description which has been made so far, the operation cost information that is stored in the operation cost information storage 11 included in the information processing device 10 is to be acquired in step S2. However, the operation cost information may be acquired, for example, from the operation cost information storage 11 provided outside the information processing device 10.

The operation cost information will be described. As described above, the operation cost information is indicative of a relationship between a state of the operator, a type of an operation, a time period required for the operator to perform the operation (hereinafter referred to as the operation time), and degree of fatigue of the operator due to the operation. However, as the operation cost information, for example, a learning model including a prediction formula, statistical information, and the like generated (built) from information indicative of a history of operations performed by the plurality of operators in the past (hereinafter referred to as the operation history information) may be used. The learning model can be generated from machine learning and the like performed for the operation history information.

As shown, for example, in FIG. 4, the operation history information includes the state information of the operator performing an operation, a type of the operation the operator has performed, the operation time required for the operation, degree of fatigue of the operator due the operation (that is, degree of fatigue of the operator after performing the operation), and the like in association with the operation ID that identifies the operation performed by the operator (that is, a history of operations). The operation history information is assumed to be collected by recognition of a motion obtained by a variety of sensors attached to the operator, an operation log of equipment and the like operated by the operator, manual input by the operator, and the like.

The operation cost information may be generated as a prediction formula and the like relating to the operation time and the degree of fatigue calculated by, for example, a publicly-known multivariate analysis method after a large number of pieces of the operation history information as shown in FIG. 4 are collected (stored).

Specifically, a prediction formula of the operation time can be calculated by a linear regression method from the state information of the operator based on the operation history information.

[Numerical Formula 1]

When, for example, the acquired state information is $X_i = \{x_{i1}, x_{i2}, \ldots x_{ik}\}$, time $t_i$ required for an operation is predicted by Equation (1) stated below.

$$t_i = \omega_0 + \sum_{j=1}^{k} \omega_i x_{ij} \qquad \text{Equation (1)}$$

In the equation, $\{x_{i1}, x_{i2}, \ldots x_{ik}\}$ represents (k types of) elements of the state information which correspond to pieces of information relating to degree of physical fatigue, a blood sugar level, concentration power, degree of tension, and the like (states) which are converted to numerical values (state values). On the other hand, $\omega_i$ (that is, $\omega_0, \omega_1, \ldots, \omega_k$) are coefficients representing degree of influence that k types of state values have on the operation time $t_i$ to be estimated.

In the present embodiment, the operation time $t_i$ can be predicted from Equation (1). In this case, $\omega_j$ needs to be calculated.

For $\omega_j, \omega_0, \ldots, \omega_k$ with which Equation (2) described below becomes minimum are calculated based on, for example, the state information $(X_1, X_2, \ldots, X_N)$ of the operator included in N sets of the operation history information collected as described above and actually measured values $(t_1, t_2, \ldots t_N)$ of the operation time corresponding to the state information $(X_1, X_2, \ldots, X_N)$. Specifically, when $X_1, X_2, \ldots, X_N$ and $t_1, t_2, \ldots, t_N$ are substituted into Equation (2), Equation (2) becomes an equation using $\omega_0, \omega_1, \ldots, \omega_k$ as variables. This equation is partially differentiated with each of $\omega_0, \omega_1, \ldots, \omega_k$, and $\omega_j$ with which the equation becomes zero can be calculated. In Equation (2), $\lambda$ is a constant.

$$\frac{1}{2}\sum_{i=1}^{N}\left(\omega_0 + \sum_{j=1}^{k}\omega_j x_{ij} - t_i\right)^2 + \frac{1}{2}\lambda\sum_{i=1}^{k}\omega_j^2 \qquad \text{Equation (2)}$$

To simplify the explanation, a formula of a simple linear regression is used. However, a function expression called a basis function may be used in place of $x_{ij}$ of Equation (1).

As described above, in the present embodiment, the operation time $t_i$ can be calculated by substituting the state information $X_i = \{x_{i1}, x_{i2}, x_{ik}\}$ and the coefficients ($\omega_0, \omega_1, \ldots, \omega_k$) obtained by Equation (2) into Equation (1) which is a prediction formula.

The case where the operation time $t_i$ is calculated has been described. When actually measured values of the operation time in Equation (2) are used as actually measured values ($f_1, f_2, \ldots, f_N$) of degree of fatigue to calculate a coefficient, and the state information and the coefficient are substituted into Equation (1), degree of fatigue $f_i$ can be calculated.

In the present embodiment, the above-mentioned prediction formula can be used as the operation cost information indicative of a relationship between a state of the operator, a type of an operation, the operation time, and degree of fatigue.

Referring back to FIG. 2, the allocation module 123 generates a plurality of operation patterns (hereinafter referred to as the operation pattern) assumed when the target operation is allocated to the target operator (step S3). In each of the operation patterns generated in step S3, for example, patterns of the target operation allocated to the target operator are varied. In this case, the allocation module 123 generates the operation patterns, for example, for all combinations of the target operators and the target operation.

Hereinafter, processing of steps S4 and S5 are executed for each of the operation patterns generated in step S3. The operation pattern to be processed in steps S4 and S5 will be referred to as the target operation pattern.

In this case, the prediction module 122 selects one of the operation patterns generated in step S3 (as the target operation pattern) (step S4).

The prediction module 122 assumes a case where the target operator performs the target operation allocated to the target operator in the target operation pattern, and calculates the operation time required for the target operator to perform the target operation and degree of fatigue of the target operator due to the target operation based on the state information acquired in step S1 (the state information of the target operator) and the operation cost information acquired in step S2 (step S5).

In this case, the prediction module 122 substitutes the state information acquired in step S1 and the coefficients calculated by Equation (2) into Equation (1) as described above to calculate the operation time and the degree of fatigue.

In the description made so far, the operation time and the degree of fatigue are calculated by using the linear regression method in the present embodiment. However, the linear regression method is mere an example, and the configuration may be such that the operation time and the degree of fatigue are calculated by using other publicly-known regression methods, such as support vector regression.

In the target operation pattern, there is a case where the plurality of target operations are allocated to one of the target operators. In this case, in step S5, the operation time and the degree of fatigue when a first one of the target operations allocated to the target operator is performed by the target operator are calculated, and then the operation time and the degree of fatigue when a second one of the target operations allocated to the target operator is performed by the target operator are calculated.

In this case, the second one of the allocated target operations is performed in a state where fatigue is accumulated due to performance of the first one of the allocated target operations. That is, the state information of the target operator when performing the second one of the target operations is changed after the target operator performs the first one of the allocated target operations. For this reason, when the operation time and the degree of fatigue are calculated for the target operator performing the second one of the allocated target operations, the state information of the target operator acquired in step S1 is updated based on the degree of fatigue calculated by estimating a case where the first one of the allocated target operations is performed.

The above similarly applies to calculation of the operation time and the degree of fatigue when third and subsequent ones of the allocated target operations are performed by the target operator.

In this manner, in step S5, the operation time and degree of fatigue are calculated (predicted) for the case where, for example, all of one or more of the target operations allocated to one of the target operators are performed by the target operator. In other words, a time period required until completion of all of the target operations allocated to the target operator (hereinafter referred to as the required time of the target operator) in the target operation pattern, and the degree of fatigue accumulated in the target operator at a time point at which all of the target operations are completed (hereinafter referred to as the degree of accumulated fatigue of the target operator) are calculated (predicted).

The case where the number of the target operators is one has been described. When the number of the target operators is more than one, the processing of step S5 is executed for each of the target operators.

Whether or not the processing of steps S4 and S5 has been executed for all of the operation patterns generated in step S3 is determined (step S6).

When the processing is determined not to have been executed for all of the operation patterns (NO in step S6), the process returns to step S4, and the processing is repeated. In this case, in step S4, the operation pattern for which the processing of steps S4 and S5 has not been executed is selected.

On the other hand, when the processing is determined to have been executed for all of the operation patterns (YES in step S6), the processing has been executed for all of the operation patterns and the required time and the degree of accumulated fatigue of the target operator in each of the operation patterns have been calculated.

The allocation module 123 determines one of all of the operation patterns generated in step S3 based on (a prediction result of) the required time and the degree of accumulated fatigue of the target operator in each of the operation patterns calculated in step S5 (step S7).

In step S7, the allocation module 123 determines the operation pattern based on, for example, a predetermined rule (predetermined policy). The predetermined rule (hereinafter referred to as the pattern determination rule) is held, for example, in the information processing device 10 in advance, and includes rules such as those described below.

The pattern determination rule includes a rule that the required times (operation finish times) of all of the target operators are close to each other when, for example, there exist the plurality of target operators. According to this rule, the required times of the target operators are compared for each of the operation patterns, and the operation pattern in which a difference between a maximum value and a minimum value of the required times of the target operators is smallest is determined.

The pattern determination rule also includes a rule that the degrees of accumulated fatigue (degrees of fatigue after an operation is finished) of all of the target operators are on the same level when there exist the plurality of target operators. According to this rule, the degrees of accumulated fatigue of the target operators are compared for each of the operation patterns, and the operation pattern in which a difference between a maximum value and a minimum value of the degrees of accumulated fatigue of the target operators is smallest is determined.

There may be used the pattern determination rule in which a total value of the required times of the target operators are calculated for each of the operation patterns, and the operation pattern that has the smallest total value of the required times is determined. There may also be used the pattern determination rule in which a total value of the degrees of fatigue of the target operators is calculated for each of the operation patterns, and the operation pattern that has the smallest total value of the degrees of fatigue is determined.

The pattern determination rule in the case where there exist the plurality of target operators has been mainly described. However, when, for example, the number of target operators is one, the pattern determination rule may include a rule that determines the operation pattern in which the required time of the target operator is smallest, or a rule that determines the operation pattern in which the degree of accumulated fatigue of the target operator is lowest. The pattern determination rule may also include a rule that determines the operation pattern in which the required time of the target operator is close to a time period specified, for example, by a manager who manages the target operator, or a rule that determines the operation pattern in which the degree of accumulated fatigue of the target operator is close to degree (a value) of fatigue specified by the manager.

Further, there may be used a rule that determines the operation pattern in which a total value of degrees of achievement of the target operators is highest after calculating the degrees of achievement of the target operators in each of the operation patterns by using an evaluation formula showing the degree of achievement based on a plurality of indices (for example, time, degree of fatigue, and the like). According to such a rule, the operation pattern can be determined based on comprehensive consideration of a plurality of indices, such as the required time and the degree of accumulated fatigue, as compared to the case where the operation pattern is determined based on one mark as described above. A weight may be set to the required time or the degree of accumulated fatigue in calculation of the degree of achievement in accordance with priority.

By setting degree of importance to the target operation, the evaluation formula may be designed so that the degree of achievement of the target operator who is allocated with the target operation with high degree of importance in the operation pattern is calculated to be high.

When the operation pattern is determined in step S7 as described above, the allocation module 123 allocates the target operation to the target operator based on the operation pattern. A result of allocation of the target operation to the target operator (result of the scheduling of operations) may be stored, for example, in the information processing device 10, or displayed on a display device (not shown) of the information processing device 10. The result of the scheduling of operations may also be output to a device outside the information processing device 10.

In the description made so far with reference to FIG. 2, the operation cost information is acquired in step S2 after the state information is acquired in step S1. However, for example, the state information may be acquired after the operation cost information is acquired. The processing of step S3 may also be executed prior to steps S1 and S2. That is, the order of the processing of steps S1 to S3 may be changed as appropriate.

Hereinafter, operation of the information processing device 10 will be specifically described. For convenience, a case where the target operations X and Y are allocated to the target operator A will be described.

In this case, the acquisition module 121 acquires the state information indicative of a state of the target operator A. The prediction module 122 acquires the operation cost information stored in the operation cost information storage 11. Detailed description of the state information and the operation cost information, which are as described above, will be omitted.

Next, the allocation module 123 generates all of the operation patterns when the target operations X and Y are allocated to the target operator A. There is possibility that the degree of fatigue accumulated in the target operator A is changed depending on order of performing the target operations. For this reason, the operation patterns including operations which are the same but performed in different order are handled as different operation patterns.

FIGS. 5 and 6 show the plurality of operation patterns generated when the target operations X and Y are allocated to the target operator A.

FIG. 5 shows a first operation pattern among the operation patterns. The first operation pattern shows that a first operation allocated to the target operator A is the target operation X, and a second operation allocated to the target operator A is the target operation Y. According to the first operation pattern, the target operator A performs the target operation Y after the target operation X.

FIG. 6 shows a second operation pattern among the operation patterns. The second operation pattern shows that a first operation allocated to the target operator A is the target operation Y, and a second operation allocated to the target operator A is the target operation X. According to the second operation pattern, the target operator A performs the target operation X after the target operation Y.

That is, the allocation module 123 generates two operation patterns, the first and second operation patterns.

Next, the prediction module 122 selects the first and second operation patterns generated by the allocation module 123, and executes processing of predicting the required time and the degree of accumulated fatigue.

First, when the first operation pattern is selected, the prediction module 122 calculates the operation time required for the target operator A to perform the target operation X (hereinafter referred to as the first operation time) and the degree of fatigue of the target operator A due to the target operation X (hereinafter referred to as the first degree of fatigue) based on the state information and the operation cost information of the target operator A acquired by the acquisition module 121.

The prediction module 122 updates the state information of the target operator A based on the first degree of fatigue. In this manner, the state information of the target operator A is updated to information indicative of a state of the target operator A to which the first degree of fatigue is reflected (accumulated).

Next, the prediction module 122 calculates the operation time required for the target operator A to perform the target operation Y (hereinafter referred to as the second operation time) and the degree of fatigue of the target operator A due to the target operation (hereinafter referred to as the second degree of fatigue) based on the updated state information and the operation cost information of the target operator A.

In this case, the prediction module 122 calculates the required time for completion of all of the target operations X and Y allocated to the target operator A in the first operation pattern as a total value of the first operation time and the second operation time. The second degree of fatigue is calculated based on the state information of the target operator A to which the first degree of fatigue (the degree of fatigue due to the target operation X allocated first) is reflected. For this reason, the second degree of fatigue is equivalent to the degree of accumulated fatigue accumulated in the target operator at a time point at which all of the target operations X and Y are completed after the target operations X and Y are performed sequentially.

On the other hand, when the second operation pattern is selected, the prediction module 122 calculates the operation time required for the target operator A to perform the target operation Y (hereinafter referred to as the third operation time) and the degree of fatigue of the target operator A due to the target operation Y (hereinafter referred to as the third degree of fatigue) based on the state information and the operation cost information of the target operator A acquired by the acquisition module 121.

The prediction module 122 updates the state information of the target operator A based on the third degree of fatigue. The prediction module 122 calculates the operation time required for the target operator A to perform the target operation X (hereinafter referred to as the fourth operation time) and the degree of fatigue of the target operator A due to the target operation X (hereinafter referred to as the fourth degree of fatigue) based on the updated state information and the operation cost information of the target operator A.

In this case, the prediction module 122 calculates the required time for completion of all of the target operations Y and X allocated to the target operator A in the second operation pattern as a total value of the third operation time and the fourth operation time. The fourth degree of fatigue is calculated based on the state information of the target operator A to which the third degree of fatigue (the degree of fatigue due to the target operation Y allocated first) is reflected. For this reason, the fourth degree of fatigue is equivalent to the degree of accumulated fatigue accumulated in the target operator A at a time point at which all of the target operations Y and X are completed after the target operations Y and X are performed sequentially.

When the required time and the degree of accumulated fatigue are calculated for the operation patterns 1 and 2 as described above, the allocation module 123 determines one operation pattern from the first and second operation patterns based on the pattern determination rule described above.

Specifically, when, for example, priority is placed on the required time, the allocation module 123 compares the required time calculated in the first operation pattern (a total value of the first operation time and the second operation time) and the required time calculated in the second operation pattern (a total value of the third operation time and the fourth operation time), and determines the operation pattern having a shorter required time in accordance with the pattern determination rule.

On the other hand, when, for example, priority is placed on the degree of accumulated fatigue, the allocation module 123 compares the degree of accumulated fatigue calculated in the first operation pattern (the second degree of fatigue) and the degree of accumulated fatigue calculated in the second operation pattern (the fourth degree of fatigue), and determines the operation pattern in which the degree of accumulated fatigue is lower in accordance with the pattern determination rule.

The configuration may be such that degree of achievement based on the required time and the degree of accumulated fatigue calculated in the first operation pattern and degree of achievement based on the required time and the degree of accumulated fatigue calculated in the second operation pattern are calculated by using the evaluation formula described above, and the operation pattern in which the degree of achievement is higher is determined.

When the first operation pattern is determined by the above processing, the allocation module 123 allocates the target operation X as the first operation and the target operation Y as the second operation to the target operator A.

On the other hand, when the allocation module 123 determines the second operation pattern, the allocation module 123 allocates the target operation Y as the first operation and the target operation X as the second operation to the target operator A.

The case where the number of the target operators is one has been described. Next, a case where the number of the target operators is two will be briefly described. Specifically, a case where the target operations X, Y, and Z are allocated to the target operators A and B will be described.

In this case, the acquisition module 121 acquires the state information indicative of states of the target operators A and B. The prediction module 122 acquires the operation cost information stored in the operation cost information storage 11.

Next, the allocation module 123 generates all of the operation patterns for allocating the target operations X, Y, and Z to the target operators A and B. Although detailed description will be omitted, when the target operator A performs two of the target operations X, Y, and Z, and the target operator B performs the other one of the target operations X, Y, and Z which is not allocated to the target operator A, six operation patterns are generated in consideration of order of performing the target operations. On the other hand, when the target operator B performs two of the target operations X, Y, and Z, and the target operator A performs the other one of the target operations X, Y, and Z which is not allocated to the target operator B, six operation patterns are generated as well.

That is, in this case, the allocation module 123 generates twelve operation patterns. When, for example, a physical condition of the target operator A is bad or the like can be determined based on the state information of the target operator A, the configuration may be such that only the operation pattern in which one operation is allocated to the target operator A and two operations are allocated to the target operator B is generated. Further, when a physical condition of the target operator A is bad, for example, the operation pattern in which all of the target operations X, Y, and Z are allocated to the target operator B may be generated.

As described above, the allocation module 123 may be configured to change generated operation patterns based on the state information and the like of the target operators A and B.

Next, the prediction module 122 selects the operation patterns (for example, twelve operation patterns) generated by the allocation module 123, and executes the processing of predicting the required time and the degree of accumulated fatigue.

Assume a case where, for example, the operation pattern shown in FIG. 7 (hereinafter referred to as the third operation pattern) is selected from the operation patterns generated by the allocation module 123. In the operation pattern 3, the target operations X and Y are allocated to the target operator A, and the target operation Z is allocated to the target operator B.

In this case, the prediction module 122 calculates the operation time required for the target operator A to perform the target operation X (hereinafter referred to as the fifth operation time) and the degree of fatigue of the target operator A due to the target operation X (hereinafter referred to as the fifth degree of fatigue) based on the state information and the operation cost information of the target operator A acquired by the acquisition module 121.

The prediction module 122 updates the state information of the target operator A based on the fifth degree of fatigue.

The prediction module 122 calculates the operation time required for the target operator A to perform the target operation Y (hereinafter referred to as the sixth operation time) and the degree of fatigue of the target operator A due to the target operation Y (hereinafter referred to as the sixth degree of fatigue) based on the updated state information and the operation cost information of the target operator A.

In this case, the prediction module 122 calculates the required time for completion of all of the target operations X and Y allocated to the target operator A in the third operation pattern as a total value of the fifth operation time and the sixth operation time. The sixth degree of fatigue is calculated based on the state information of the target operator A to which the fifth degree of fatigue (the degree of fatigue due to the target operation X allocated first) is reflected. For this reason, the sixth degree of fatigue is equivalent to the degree of accumulated fatigue accumulated in the target operator A at a time point at which all of the target operations X and Y are completed after the target operations X and Y are performed sequentially.

The prediction module 122 calculates the operation time required for the target operator B to perform the target operation Z (hereinafter referred to as the seventh operation time) and the degree of fatigue of the target operator B due to the target operation (hereinafter referred to as the seventh degree of fatigue) based on the state information and the operation cost information of the target operator B acquired by the acquisition module 121.

According to the above, the required time of the target operator A in the third operation pattern shown in FIG. 7 is a total value of the fifth operation time and the sixth operation time, and the degree of accumulated fatigue of the target operator A is the sixth degree of fatigue. On the other hand, the required time of the target operator B in the third operation pattern is the seventh operation time and the degree of accumulated fatigue of the target operator B is the seventh degree of fatigue.

Although only the third operation pattern shown in FIG. 7 has been described, the required times and the degrees of accumulated fatigue of the target operators A and B are calculated for all of the twelve operation patterns generated by the allocation module 123 described above.

When the required time and the degree of accumulated fatigue are calculated for all of the twelve operation patterns as described above, the allocation module 123 determines one operation pattern from the twelve operation patterns based on the pattern determination rule described above.

Specifically, when, for example, priority is placed on the required time, the allocation module 123 determines the operation pattern in which a difference in the required times of the target operators A and B calculated for each of the operation patterns is smallest (that is, operation finish times of the target operators A and B are close to each other) in accordance with the pattern determination rule.

When, for example, priority is placed on the degree of accumulated fatigue, the allocation module 123 determines the operation pattern in which a difference in the degrees of accumulated fatigue of the target operators A and B calculated for each of the operation patterns is smallest (that is, the degrees of accumulated fatigue of the target operators A and B are on the same level) in accordance with the pattern determination rule.

The configuration may be such that degree of achievement is calculated based on the required times and the degrees of accumulated fatigue of the target operators A and B calculated in each of the operation patterns by using the evaluation formula described above, and the operation pattern in which (a total value of) the degrees of achievement of the target operators is highest is determined.

When one target operation is allocated to the plurality of target operators, the operation pattern in which, for example, the target operation is allocated to the target operator that requires a shortest period of time to perform the target operation, or the target operation is allocated to the target operator whose degree of fatigue due to the target operation is lowest may be determined.

When, for example, the third operation pattern is determined by the above processing, the allocation module 123 allocates the target operation X as a first operation and the target operation Y as a second operation to the target operator A. The allocation module 123 also allocates the target operation Z to the target operator B.

As described above, in the present embodiment, the operation time required for the target operator to perform the target operation is calculated (predicted) based on the state information indicative of a state of the target operator and the operation cost information stored in the operation cost information storage 11. In the present embodiment, the operation time (required time) calculated as described above is used, so that the scheduling of operations can be performed in consideration of a state (for example, a physical condition) of the operator.

In the present embodiment, the degree of fatigue of the target operator due to the target operation is calculated (predicted) based on the state information indicative of a state of the target operator and the operation cost information stored in the operation cost information storage 11. In the present embodiment, the degree of fatigue (degree of accumulated fatigue) calculated as described above is used, so that the scheduling of operations can be performed in consideration of a state (for example, a physical condition) of the operator. In the present embodiment, when the plurality of target operations are allocated to one target operator, the state information indicative of a state of the target operator is updated based on the degree of fatigue due to the target operation allocated first, and the degree of fatigue due to the target operation allocated second is calculated by using the updated state information. According to this configuration, the degree of fatigue for the target operation allocated second can be predicted in consideration of fatigue accumulated by performing the target operation allocated first. Accordingly, the degree of accumulated fatigue can be predicted appropriately.

As described above, the present embodiment enables the scheduling of operations in which the operation time and the degree of fatigue can be reduced in consideration of a state, such as a physical condition, of each of the operators. In this manner, productivity can be improved effectively.

In the present embodiment, the required time or the degree of accumulated fatigue are calculated in each of the plurality of operation patterns, and one of the operation patterns is determined based on the required time and the degree of accumulated fatigue so as to allocate the target operation to the target operator. According to this configuration, the scheduling of operations can be performed based on an optimum operation pattern among the plurality of operation patterns.

In the present embodiment, the allocation module 123 can allocate the target operation to the target operator based at least on either one of the required time and the degree of accumulated fatigue. However, the configuration may be such that the information processing device 10 according to the present embodiment executes only the processing of calculating the required time and the degree of accumulated fatigue of the target operators with respect to the target operations, and the (processing of) allocating the target operations to the target operators is executed by an external device or the like of the information processing device 10.

In the present embodiment, the operation cost information includes a learning model that is generated based on the operation history information indicative of a history of operations performed by the operator in the past. The learning model can output a period of time required for the operator to perform an operation when the state information of the operator is input. By the above configuration, the present embodiment can calculate the required time and the degree of accumulated fatigue accurately based on the operation history information in the past.

In the present embodiment, real-time information output from a sensor attached to the target operator is acquired as the state information. Accordingly, a state (physical condition) of the target operator can be grasped correctly, and the scheduling of operations can be performed as appropriate for a state of the target operator.

Second Embodiment

Next, a second embodiment will be described. FIG. 8 is a block diagram showing an example of a configuration of the information processing device (operation scheduling device) according to the present embodiment. In FIG. 8, the same structures as FIG. 1 are denoted by the same reference numbers, detailed description thereof being omitted. Here, structures different from those of FIG. 1 are mainly described.

The information processing device 10 according to the present embodiment is different from that in the first embodiment described above with respect to the point that the operation cost information is corrected based on attribute information indicative of attributes relating to the operator.

As shown in FIG. 8, the information processing device 10 includes an attribute information storage 13 in addition to the operation cost information storage 11 described in the first embodiment described above.

The attribute information storage 13 is implemented by using a storage device like the operation cost information storage 11. The attribute information storage 13 stores attribute information indicative of attributes relating to the operator. The attribute information is prepared for each operator, and is unique to the operator.

The processor 12 included in the information processing device 10 includes a correction module 124 in addition to the acquisition module 121, the prediction module 122, and the allocation module 123 described in the first embodiment above. A part or whole of the correction module 124 is implemented, for example, by causing a computer to execute a scheduling program, that is, by software. A part or whole of the correction module 124 may be implemented, for example, by hardware, or by a combined configuration of software and hardware.

The correction module 124 corrects the operation cost information stored in the operation cost information storage 11 based on the attribute information stored in the attribute information storage 13.

In the present embodiment, the operation cost information corrected as described above is used for calculation (prediction) of the required time and the degree of accumulated fatigue of the target operator.

Figure 9:
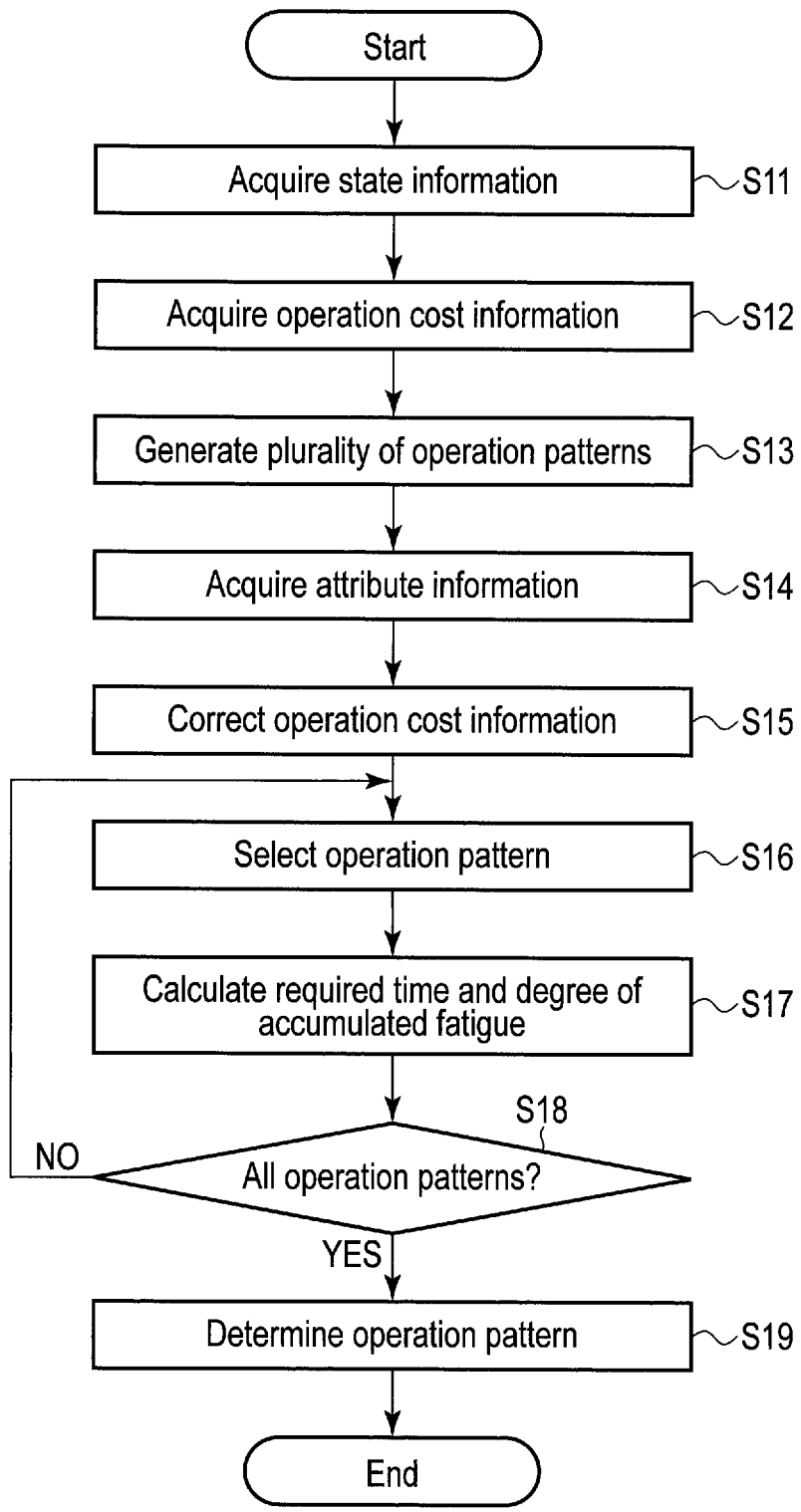
FIG. 9 is a flowchart showing an example of a processing procedure of the information processing device.

Next, an example of a processing procedure of the information processing device 10 according to the present embodiment will be described with reference to a flowchart of FIG. 9. In the description below, an operator to which an operation is allocated and an operation to be allocated to the operator will be referred to as the target operator and the target operation, respectively.

First, processing of steps S11 to S13, which is equivalent to the processing of steps S1 to S3 shown in FIG. 2 described above, is executed.

Next, the correction module 124 acquires the attribute information stored in the attribute information storage 13 (step S14). In the description which has been made so far, the attribute information stored in the attribute information storage 13 included in the information processing device 10 is acquired in step S14. However, the attribute information may be acquired from the attribute information storage 13 provided outside the information processing device 10.

As shown, for example, in FIG. 10, the attribute information includes accumulated operation time, an operation history, a skill, and the like in association with an operator ID.

The operator ID is an identifier for uniquely identifying the operator. The accumulated operation time is indicative of accumulated operation time in the past classified by types of operations of the operator identified by the operator ID associated with the accumulated operation time. The operation history is indicative of a history of operations performed in the past by the operator identified by the operator ID associated with the operation history, and includes operation IDs for identifying the operations, and the like. The skill is indicative of a skill of the operator identified by the operator ID associated with the skill.

As described above, the attribute information storage 13 stores the attribute information for each of (the operators identified by) the operator IDs.

In step S14, the correction module 124 acquires the attribute information corresponding to the target operator (that is, the attribute information including the operator ID for identifying the target operator) among pieces of the attribute information stored in the attribute information storage 13. When there are the plurality of target operators, the attribute information of each of the target operators is acquired.

Next, the correction module 124 corrects the operation cost information acquired in step S12 based on the attribute information acquired in step S14 (step S15).

In step S15, for example, the correction module 124 acquires the state information of the target operator and the operation time required for an operation when the target operator has performed the operation in the operation history (the operation history of the target operator) included in the attribute information from the operation history information shown in FIG. 4 described above, and calculates a correlation between the state information and the operation time.

In this case, the correction module 124 corrects the operation cost information so that a relationship (distribution) between, for example, a state of the operator and the operation time required for the operator to perform the operation indicated by the operation cost information acquired in step S12 matches with the correlation described above.

Similarly, for example, the correction module 124 acquires the state information of the target operator and the degree of fatigue of the target operator due to an operation when the target operator has performed the operation in the operation history included in the attribute information from the operation history information, and calculates a correlation between the state information and the degree of fatigue.

In this case, the correction module 124 corrects the operation cost information so that a relationship (distribution) between the state of the operator indicated by the operation cost information and the degree of fatigue of the operator matches with the correlation described above.

That is, the operation cost information corrected by the correction module 124 is equivalent to the operation cost information generated based on the operation history information indicative of a history of operations performed by the target operator (the operation history information of the target operator), and can be considered as the operation cost information specialized for the target operator.

When there are the plurality of target operators, the attribute information corresponding to each of the target operators is acquired. In step S15, the operation cost information is corrected for each of the target operators based on each piece of the attribute information. That is, when, for example, the number of the target operators is M, the processing of correcting the operation cost information is executed M times for the attribute information of the target operators. According to this configuration, the operation cost information (M pieces of the operation cost information) is generated for the target operators corrected based on the attribute information of the target operators.

In the description which has been made so far, the operation history included in the attribute information is used to correct the operation cost information. However, the accumulated operation time and the skill included in the attribute information may be used for the correction of the operation cost information.

For example, when the accumulated operation time of an operation of the same type as the target operation is larger than, for example, a value determined in advance, the operation cost information may be corrected so that the operation time calculated based on the operation cost information become shorter. Alternatively, the operation cost information may be corrected so that the degree of fatigue calculated based on the operation cost information becomes lower. When the skill relating to the target operation is included in the attribute information of the target operator, the operation cost information acquired in step S12 may be corrected similarly.

The operation cost information acquired in step S12 may also be corrected so that the operation history information of another operator whose accumulated operation time and skill are on the same level as those of the target operator is also reflected to the operation cost information, in addition to the operation history information of the target operator.

Hereinafter, processing of steps S16 to S19 is executed. The processing of steps S16 to S19 is similar to the processing of steps S4 to S7 shown in FIG. 2 described above other than that the operation cost information used for calculation of the required time and the degree of accumulated fatigue of the target operator is the operation cost information of the target operator corrected in step S15 described above. For this reason, detailed description of the processing will be omitted.

As described above, in the present embodiment, the operation cost information is corrected based on the attribute information indicative of the attributes relating to the target operator. This configuration enables prediction of the required time and the degree of accumulated fatigue by using the operation cost information specialized for the target operator. Accordingly, prediction accuracy can be improved as compared to that in the first embodiment described above.

Third Embodiment

Next, a third embodiment will be described. FIG. 11 is a block diagram showing an example of a configuration of the information processing device (operation scheduling device) according to the present embodiment. In FIG. 11, the same structures as FIGS. 1 and 8 are denoted by the same reference numbers, detailed description thereof being omitted. Here, structures different from those of FIGS. 1 and 8 are mainly described.

The information processing device 10 according to the present embodiment is different from those in the first and second embodiments described above with respect to the point that the operation cost information is corrected based on information relating to an environment in which the operator performs an operation (operating environment).

In the present embodiment, the attribute information stored in the attribute information storage 13 includes at least a history of operations that the operator has performed in the past and environment information indicative of an environment in which the operations are performed. The attribute information storage 13 stores attribute information of each operator.

As shown in FIG. 11, the processor 12 included in the information processing device 10 includes a second acquisition module 125 in addition to the acquisition module (first acquisition module) 121, the prediction module 122, the allocation module 123, and the correction module 124 described in the first and second embodiments described above. A part or whole of the second acquisition module 125 is implemented, for example, by causing a computer to execute a scheduling program, that is, by software. A part or whole of the second acquisition module 125 may be implemented, for example, by hardware, or by a combined configuration of software and hardware.

The second acquisition module 125 acquires information relating to the operating environment in which the operator to be allocated with an operation performs the operation (hereinafter referred to as the environment information).

In the present embodiment, the correction module 124 corrects the operation cost information stored in the operation cost information storage 11 based on the attribute information stored in the attribute information storage 13 and the environment information acquired by the second acquisition module 125.

In the present embodiment, the required time and the degree of accumulated fatigue of the target operator are calculated (predicted) by using the operation cost information corrected in the above manner.

Figure 12:
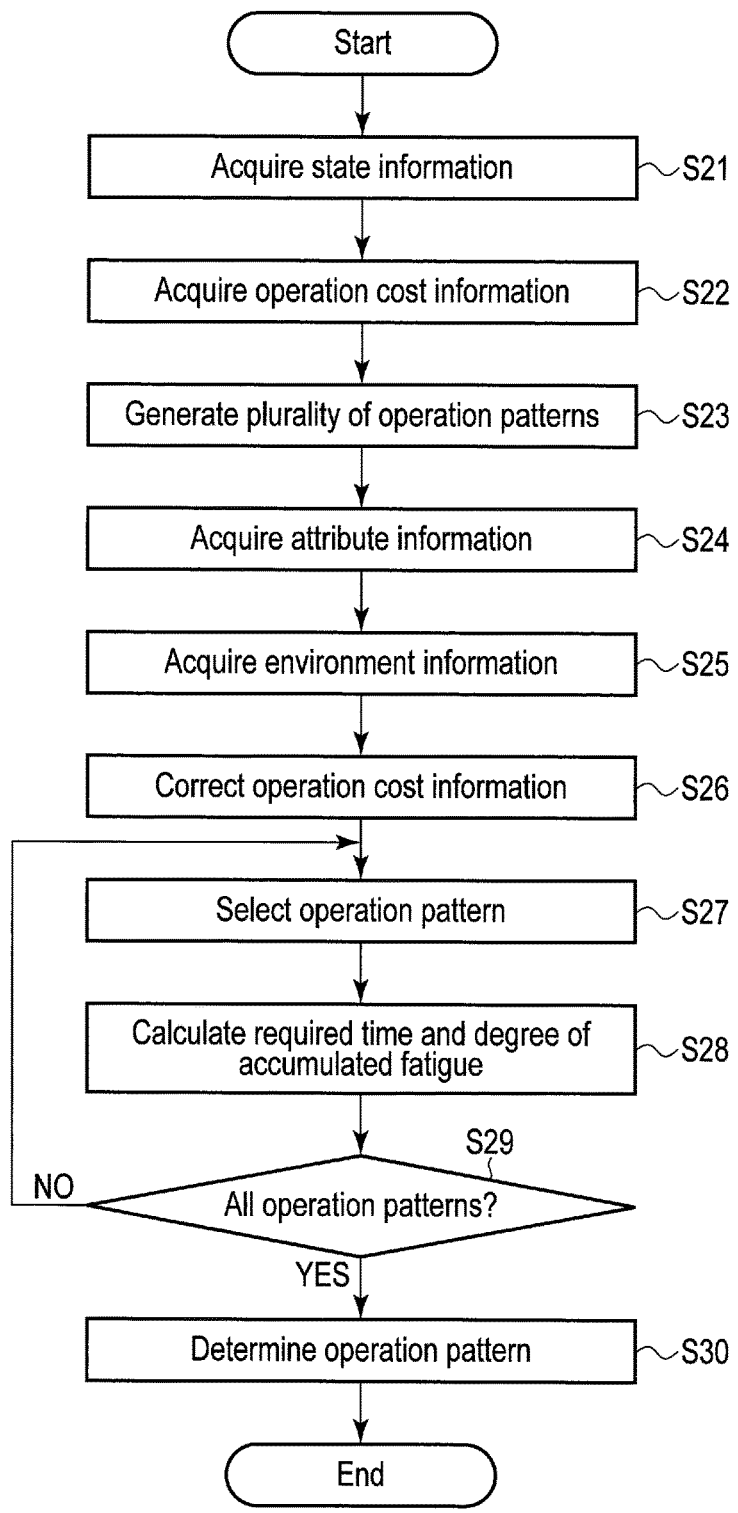
FIG. 12 is a flowchart showing an example of a processing procedure of the information processing device.

Next, an example of a processing procedure of the information processing device 10 according to the present embodiment will be described with reference to a flowchart of FIG. 12. In the description below, the operator to be allocated with an operation and an operation to be allocated to the operator will be referred to as the target operator and the target operation, respectively.

First, processing of steps S21 to S23 equivalent to the processing of steps S1 to S3 shown in FIG. 2 described above is executed.

Next, the correction module 124 acquires the attribute information stored in the attribute information storage 13 (step S24).

The attribute information stored in the attribute information storage 13 in the present embodiment includes the operation history and the environment information in association with the operator ID as shown, for example, in FIG. 13.

The operator ID is an identifier for uniquely identifying the operator. The operation history is indicative of a history of operations performed in the past by the operator identified by the operator ID associated with the operation history, and includes operation IDs for identifying the operations, and the like. The environment information is indicative of an environment in which an operation identified by the operation ID associated with the environment information is performed, and includes, for example, weather, temperature, humidity, atmospheric pressure, and the like.

As described above, the attribute information storage 13 includes the attribute information for each of (the operators identified by) the operator IDs.

In step S24, the correction module 124 acquires the attribute information corresponding to the target operator (that is, the attribute information including the operator ID for identifying the target operator) among pieces of the attribute information stored in the attribute information storage 13. When there are the plurality of target operators, the attribute information of each of the target operators is acquired.

Next, the second acquisition module 125 acquires the environment information indicative of an environment in which the target operation is performed (step S25). The environment information includes, for example, weather, temperature, humidity, atmospheric pressure, and the like in association with the operation ID for identifying the target operation. The (information relating to) weather, temperature, humidity, atmospheric pressure, and the like are acquired from, for example, a variety of sensors attached to a location in which the target operation is performed, an external device, or the like.

Specifically, (information relating to) weather can be acquired from, for example, an external server device that holds weather information and the like. (Information relating to) temperature, humidity, and atmospheric pressure can be acquired from, for example, a thermometer, a hygrometer, a barometer, and the like.

The correction module 124 corrects the operation cost information acquired in step S12 based on the attribute information acquired in step S24 and the environment information acquired in step S25 (step S26).

In step S26, for example, the correction module 124 identifies the operation history (the operation history of the target operator) included in the attribute information in a manner associated with the environment information acquired in step S25, and acquires the state information of the target operator and the operation time required for the operation when the target operator has performed the operation in the identified operation history from the operation history information shown in FIG. 4 described above. The correction module 124 calculates a correlation between the state information and the operation time acquired as described above.

In this case, the correction module 124 corrects the operation cost information so that a relationship (distribution) between, for example, the state of the operator and the operation time required for the operator to perform the operation indicated by the operation cost information acquired in step S22 matches with the correlation described above.

Similarly, for example, the correction module 124 identifies the operation history (the operation history of the target operator) included in the attribute information in a manner associated with the environment information acquired in step S25, and acquires the state information of the target operator and the degree of fatigue of the target operator due to the operation when the target operator has performed the operation in the identified operation history from the operation history information. The correction module 124 calculates a correlation between the state information and the degree of fatigue acquired as described above.

In this case, the correction module 124 corrects the operation cost information so that a relationship (distribution) between the state of the operator and the degree of fatigue of the operator indicated by the operation cost information matches with the correlation described above.

That is, the operation cost information corrected by the correction module 124 is equivalent to the operation cost information generated based on the operation history information (the operation history information of the target operator) indicative of a history of operations that the target operator has performed in an environment indicated by the environment information acquired in step S25 (the operation history information of the target operator), and can be considered as the operation cost information specialized for the target operator and the environment indicated by the environment information.

When there are the plurality of target operators, the attribute information corresponding to each of the target operators is acquired. In step S26, the operation cost information is corrected for each of the target operators based on each piece of the attribute information. In other words, in step S26, the operation cost information for each of the target operators corrected based on the attribute information of each of the target operators is generated.

When, for example, the weather is determined to be bad, the temperature and humidity are determined to be high, or the atmospheric pressure is determined to be low based on the environment information acquired in step S26, the operation cost information may be corrected so that the operation time calculated based on the operation cost information becomes longer, or the degree of fatigue calculated based on the operation cost information becomes higher. Similarly, when, for example, the temperature and humidity, and the like are within a range of values determined in advance (that is, the temperature and humidity are appropriate) based on the environment information, the operation cost information may be corrected so that the operation time calculated based on the operation cost information becomes shorter, or the degree of fatigue calculated based on the operation cost information becomes lower.

Hereinafter, processing of steps S27 to S30 is executed. The processing of steps S27 to S30 is similar to the processing of steps S4 to S7 shown in FIG. 2 described above other than that the operation cost information used for calculation of the required time and the degree of accumulated fatigue of the target operator is the operation cost information of the target operator corrected in step S26 described above. Accordingly, detailed description of the processing will be omitted.

As described above, in the present embodiment, the operation cost information is corrected based on the environment information indicative of an environment in which the target operator performs an operation. By this configuration, the required time and the degree of accumulated fatigue can be predicted by using the operation cost information specialized for the environment (and the target operator). Accordingly, prediction accuracy can be improved more as compared to that in the first embodiment described above.

In the description of the present embodiment which has been made so far, the attribute information which is different from the attribute information described in the second embodiment is used. However, the configurations of the present embodiment and the second embodiment may be combined. According to this configuration, the operation cost information can be corrected based on the attributes (the operation history, accumulated operation time, and skill) of the target operator included in the attribute information and the environment information. Accordingly, the prediction accuracy can be improved more.

According to at least one of the embodiments described above, there can be provided the information processing device, the method, and the program that enable the scheduling of operations in consideration of a state of the operator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a hardware processor configured to:
repeatedly acquire, from a plurality of sensors attached to a plurality of operators, state information of the plurality of operators, the plurality of operators include a target operator, and the state information include first state information indicative of a state of the target operator;
update operation history information to include the acquired state information, the operation history information indicative of a history of operations performed by the plurality of operators and a history of the state information of the plurality of operators;
generate, by using machine learning, a first learning model and a second learning model based on the operation history information, the first learning model outputting a period of time required for an operator to perform an operation by applying state information of the operator, the second learning model outputting degree of fatigue of an operator due to an operation by applying state information of the operator;
calculate a first period of time required for the target operator to perform a first target operation by applying the first state information to the first learning model, calculate first degree of fatigue of the target operator due to the first target operation by applying the first state information to the second learning model, obtain second state information of the target operator by reflecting the first degree of fatigue to the first state information, calculate a second period of time required to perform a second target operation by applying the second state information to the first learning model, and calculate second degree of fatigue of the target operator due to the second target operation by applying the second state information to the second learning model,
calculate a third period of time required to perform the second target operation by applying the first state information to the first learning model, calculate third degree of fatigue of the target operator due to the second target operation by applying the first state information to the second learning model, obtain third state information of the target operator by reflecting the third degree of fatigue to the first state information, calculate a fourth period of time required to perform the first target operation by applying the third state information to the first learning model, and calculate fourth degree of fatigue of the target operator due to the first target operation by applying the third state information to the second learning model, and allocate the first target operation and the second target operation to the target operator in consideration of order of performing the first and second target operations by comparing a first total value of the first period of time and the second period of time with a second total value of the third period of time and the fourth period of time or by comparing the second degree of fatigue with the fourth degree of fatigue.

2. The information processing device according to claim 1, wherein the hardware processor is further configured to:
generate a plurality of operation patterns for allocating the target operation to the target operator,
calculate a period of time required for the target operator to perform a target operation allocated to the target operator for each of the operation patterns,
determine one of the operation patterns based on a period of time calculated for each of the operation patterns, and
allocate the target operation to the target operator in accordance with the determined operation pattern.

3. The information processing device according to claim 1, further comprising:
an attribute information storage configured to store attribute information indicative of an attribute relating to an operator; wherein
the hardware processor is further configured to correct the first learning model and the second learning model based on attribute information indicative of an attribute of the target operator.

4. The information processing device according to claim 1, wherein the hardware processor is further configured to:
acquire environment information relating to an environment in which an operation is performed; and
correct the first learning model and the second learning model based on the environment information.

5. The information processing device according to claim 1, wherein the sensor is attachable to the target operator.

6. The information processing device according to claim 1, further comprising the storage.

7. The information processing device according to claim 1, wherein the sensor is a wearable device configured to measure one or more of the target operator's:
myogenic potential,
blood sugar level,
ocular potential, or
blood alcohol concentration.

8. The information processing device according to claim 1, wherein the sensor is a wearable device comprising one or more of:
a myogenic potential sensor,
a blood sugar level sensor,
a ocular potential sensor, or
a blood alcohol concentration sensor.

9. The information processing device according to claim 1, wherein the hardware processor is further configured to:
display, on a display device, the allocated first and second target operations and the determined order of performing the first and second target operation.

10. A method executed by an information processing device, comprising:
repeatedly acquiring, from a plurality of sensors attached to a plurality of operators, state information of the plurality of operators, the plurality of operators include a target operator, and the state information include first state information indicative of a state of the target operator;
updating operation history information to include the acquired state information, the operation history information indicative of a history of operations performed by the plurality of operators and a history of the state information of the plurality of operators;
generating, by using machine learning, a first learning model and a second learning model based on the operation history information, the first learning model outputting a period of time required for an operator to perform an operation by applying state information of the operator, the second learning model outputting degree of fatigue of an operator due to an operation by applying state information of the operator;
calculating a first period of time required for the target operator to perform a first target operation by applying the first state information to the first learning model, calculating first degree of fatigue of the target operator due to the first target operation by applying the first state information to the second learning model, obtaining second state information of the target operator by reflecting the first degree of fatigue to the first state information, calculating a second period of time required to perform the second target operation by applying the second state information to the first learning model, calculating second degree of fatigue of the target operator due to the second target operation by applying the second state information to the second learning model, calculating a third period of time required to perform the second target operation by applying the first state information to the first learning model, calculating third degree of fatigue of the target operator due to the second target operation by applying the first state information to the second learning model, obtaining third state information of the target operator by reflecting the third degree of fatigue to the first state information, calculating a fourth period of time required to perform the first target operation by applying the third state information to the first learning model, and calculating fourth degree of fatigue of the target operator due to the first target operation by applying the third state information to the second learning model, and allocating the first target operation and the second target operation to the target operator in consideration of order of performing the first and second target operations by comparing a first total value of the first period of time and the second period of time with a second total value of the third period of time and the fourth period of time or by comparing the second degree of fatigue with the fourth degree of fatigue.

11. The method according to claim 10, wherein the sensor is attachable to the target operator.

12. The method according to claim 11, wherein the sensor is a wearable device configured to measure one or more of the target operator's:
myogenic potential,
blood sugar level,
ocular potential, or
blood alcohol concentration.

13. The method according to claim 11, wherein the sensor is a wearable device comprising one or more of:
- a myogenic potential sensor,
- a blood sugar level sensor,
- a ocular potential sensor, or
- a blood alcohol concentration sensor.

14. The method according to claim 10, further comprising:
- displaying, on a display device, the allocated first and second target operations and the determined order of performing the first and second target operation.

\* \* \* \* \*

UNITED STATES PATENT AND TRADEMARK OFFICE
CERTIFICATE OF CORRECTION

PATENT NO. : 11,715,049 B2
APPLICATION NO. : 15/904633
DATED : August 1, 2023
INVENTOR(S) : Tsukasa Ike et al.

It is certified that error appears in the above-identified patent and that said Letters Patent is hereby corrected as shown below:

In the Claims

Claim 1, Column 20, Lines 30-31, "and the state information include" should read --and the state information includes--.

Claim 8, Column 21, Line 61, "a ocular potential sensor" should read --an ocular potential sensor--.

Claim 9, Column 21, Line 67, "the first and second target operation" should read --the first and second target operations--.

Claim 10, Column 22, Line 6, "and the state information include" should read --and the state information includes--.

Claim 13, Column 23, Line 5, "a ocular potential sensor" should read --an ocular potential sensor--.

Claim 14, Column 23, Line 11, the first and second target operation" should read --the first and second target operations--.

Signed and Sealed this
Seventeenth Day of October, 2023

Katherine Kelly Vidal
*Director of the United States Patent and Trademark Office*